United States Patent [19]

Hall et al.

[11] Patent Number: 5,320,700

[45] Date of Patent: Jun. 14, 1994

[54] PROCESS FOR MOLDING UTILIZING COMPRESSION SLEEVE

[75] Inventors: Charles M. Hall; Wen W. Tseng; Ralph Beavers, all of Bartlesville, Okla.

[73] Assignee: Phillips Petroleum Company, Bartlesville, Okla.

[21] Appl. No.: 684,732

[22] Filed: Apr. 15, 1991

[51] Int. Cl.$^5$ .................... B29C 43/14; B32B 31/20
[52] U.S. Cl. ................. 156/309.6; 156/245; 264/258; 264/338
[58] Field of Search ............. 156/309.6, 323, 245; 264/258, 316, 313, 130, 338, 320, DIG. 65

[56] References Cited

U.S. PATENT DOCUMENTS

| | | | |
|---|---|---|---|
| H000,559 | 12/1988 | Brown | 264/102 |
| 2,962,767 | 12/1960 | Trojanowski | 264/313 |
| 3,608,052 | 9/1971 | Gunn | 264/313 |
| 3,962,394 | 6/1976 | Hall | 156/285 |
| 4,038,018 | 7/1977 | Pepmeier | 156/459 |
| 4,292,105 | 9/1981 | Taylor | 156/242 |
| 4,353,964 | 10/1982 | Grimm | 264/258 |
| 4,410,385 | 10/1983 | Murphy | 156/290 |
| 4,462,946 | 7/1984 | Goldsworthy | 264/23 |
| 4,576,857 | 3/1986 | Gannett | 156/53 |
| 4,613,393 | 9/1986 | Cattanach | 156/323 |
| 4,695,344 | 9/1987 | Crane et al. | 156/245 |
| 4,740,583 | 4/1988 | Brunelle | 528/370 |
| 4,770,839 | 9/1988 | Cattanach | 264/316 |
| 4,786,348 | 11/1988 | Luise | 156/309.6 |
| 4,803,020 | 2/1989 | Valaitis | 264/347 |
| 4,816,102 | 3/1989 | Cavin | 156/180 |
| 4,820,366 | 4/1989 | Beever | 156/433 |
| 4,842,787 | 6/1989 | Chess | 156/309.6 |
| 4,874,563 | 10/1989 | McMahon | 264/DIG. 75 |
| 4,904,436 | 2/1990 | Rachol | 264/258 |
| 4,915,896 | 4/1990 | Rachal | 264/258 |
| 4,956,141 | 9/1990 | Allen et al. | 264/316 |
| 4,962,143 | 10/1990 | Satake | 264/290.2 |
| 5,039,572 | 8/1991 | Bobsein | 264/258 |
| 5,108,532 | 4/1992 | Thien | 156/285 |
| 5,116,216 | 5/1992 | Cochran | 156/286 |
| 5,176,868 | 1/1993 | Davis | 264/258 |
| 5,200,274 | 4/1993 | Chung | 427/171 |

FOREIGN PATENT DOCUMENTS 1485586 9/1977 United Kingdom ............... 156/174

OTHER PUBLICATIONS

Modern Plastics Encyclopedia, Oct. 1983 vol. 60, No. 10A, pp. 65-66, 490-491.

Primary Examiner—Michael W. Ball
Assistant Examiner—Daniel J. Stemmer
Attorney, Agent, or Firm—Ryan N. Cross

[57] ABSTRACT

A high temperature film wrapping is used to wrap thermoplastic materials before they are molded. The thermoplastic material can then be molded by applying heat and pressure and the resulting thermoplastic material will contain reduced cracks and voids compared with thermoplastic materials molded without the wrapping.

16 Claims, No Drawings

PROCESS FOR MOLDING UTILIZING COMPRESSION SLEEVE

This invention generally relates to the molding of thermoplastics and in the production of thermoplastic laminates and, more particularly, to the use of high temperature film wrapping in such molding and production operations.

It is known in the art to mold thermoplastics by heating them to their melting or softening points, placing them in a mold, pressing them under pressure and afterwards cooling them. Thermoplastic materials molded in this method often contain cracks due to adhesion to the molds. Unidirectional fiber reinforced laminates are particularly susceptible to cracks along the reinforcing fibers. Furthermore, the molded products are subject to voids probably due to excessive amounts of resin being squeezed out of the mold after melting has occurred.

It is, therefore, an object of this invention to provide a process of molding thermoplastic material and producing thermoplastic laminates which reduces adhesion between the molded products and the molds.

It is a another object of this invention to provide a process of molding thermoplastic material and producing thermoplastic laminates which prevents excessive amounts of resin from being squeezed out of the laminates and/or the molds.

It is a further object of this invention to provide a process of molding thermoplastic materials and producing thermoplastic laminates that reduces the occurrence of cracks and voids in the molded product.

It is still a further object of this invention to successfully form fiber-reinforced thermoplastic laminates from individual fiber-reinforced thermoplastic laminae without using a positive pressure or frame mold.

The above objects are realized in a method which comprises: wrapping a sleeve material around at least one thermoplastic material to form a sleeve-wrapped material; heating the sleeve-wrapped material to a molten state; compressing the sleeve-wrapped material to form a formed material; and cooling the formed material to harden said formed material.

The process of the present invention accomplishes the forming of thermoplastic materials both with and without a mold. It is useful in the formation of laminates, composites and molded products.

The thermoplastic material can be in any convenient form. Typically, it is in the form of a powder, pellets, piled sheets of lamina or a laminate. It can be any suitable thermoplastic, examples of which are poly(arylene sulfide), polyester, polyamide, polyarylate, polycarbonate, polyphenylene oxide, polyimide, polyamideimide, polyether ether ketone, polysulfone, and thermoplastic elastomer resins and fiber-resin composites. Presently preferred are poly(arylene sulfide) resins and fiber-resin composites. Poly(arylene sulfide) resins are a family of aromatic sulfide polymers having the general formula. $(AR-X-AR-S)_n$. The aromatic unit, AR, can be a mono or polycylic moiety and X may be selected from a least one of the groups O, S, $SO_2$, CO, OCO, NCHO, etc. The member of the poly(arylene sulfide) family which was utilized for the examples set forth below is poly(phenylene sulfide).

If the thermoplastic material is a fiber-resin composite, the fibers can be any suitable fibers, or combination of suitable fibers, preferably ones with a melting point higher than that of the thermoplastic matrix material. Typically, fibers are made from glass, quartz, aramids, metals, ceramics and carbon.

If a laminate is to be formed by the inventive process typically the laminae will be stacked before wrapping. The laminae can consist of sheets of the same or differing thermoplastic material in order to form a composite during the forming process.

The thermoplastic material is wrapped in a sleeve or film. The sleeve or film wrap can completely enclose the thermoplastic material or it can leave one or two ends open. Typically, if the sleeve does not completely enclose the thermoplastic material, two ends will be left open and a mold will be utilized. With a unidirectional fiber-reinforced thermoplastic material, the ends left open will generally be transverse to the lengthwise direction of the reinforcing fibers.

The sleeve can be any material that can withstand the processing temperatures and has the physical integrity to retain adequate stiffness and strength. The sleeve material should have adequate release properties to insure clean removal of the formed thermoplastic material. Examples of suitable sleeve materials are polyimides, aluminum foil, polytetrafluoroethylene release cloth, and glass cloth fabric. The preferred sleeve material is a polyimide film produced from p,p'-diaminodiphenylether and puromellitic dianhydride marketed under the registered trademark KAPTON ® by I.E. Du Pont De Nemours and Company. The sleeve can also be coated with a releasing agent in order to insure adequate release from the thermoplastic material or to insure adequate release from a mold, if used, or the compression plates. Releasing agents are lubricants, liquids or powders used to prevent sticking of molded articles to the sleeve material. Typical releasing agents are silicone oils and silicone waxes.

The texture of the formed product will be determined at least in part by the sleeve material chosen. Also, inserts can be placed with the thermoplastic material and wrapped within the sleeve in order to alter the final product as desired. Typically inserts are added to alter the desired surface texture of the products, alter the form of the product, and to obtain desired effects in the material. Examples of inserts to alter the texture are release cloths, aluminum foil, and polished plates.

The sleeve-wrapped thermoplastic material is heated to an appropriate temperature to insure that the thermoplastic material is in a molten state. Molten state as used in the specification and claims is defined as a state in which the material is at least soft enough to mold and can be one in which the material is melted. Whether a softened or melted state is selected as the molten state will depend on the type of forming desired. Generally, softening is sufficient for molding; however, melting is preferable when a laminate is to be formed. The temperature needed to insure that the thermoplastic material is in a molten state will vary depending on the thermoplastic material used. Naturally, the temperature should be low enough so as to not melt the sleeve, any inserts, or any reinforcing fibers within the thermoplastic material. For poly(phenylene sulfide) (PPS) , the temperature necessary to insure that the thermoplastic material is in a molten state will generally be in the range of from about 288° C. (550° F.) to about 371° C. (700° F.).

The wrapped thermoplastic material can be heated within the device used for compression, with heating and compression occurring step-wise or simultaneously. Alternatively, the thermoplastic material can be heated and then transferred to the compression device. Typically, in either case, the compression device will be heated and the wrapped thermoplastic material will be maintained at a substantially constant temperature throughout compression. The compression pressure will depend on the type of thermoplastic material used and the product desired. In general, it will be in the range of from about contact pressure to about 2.76 MPa (400 psi), preferably from about contact pressure to about 2.09 MPa (300 psi). Contact pressure consists of the pressure of the plates or mold with no additional pressure provided. Additionally, the wrapped thermoplastic material can be under pressure while it is heated, preferably with a higher pressure being used during compression, than was used during heating. In general, the heating pressure will be in the range of from about contact pressure to about 0.69 MPa (100 psi), and the compression pressure will be in the range of from about 0.69 MPa (100 psi) to about 3.44 MPa (500 psi). Preferably, the heating pressure will be in the range of contact pressure to about 0.34 MPa (50 psi), and the compression pressure will be in the range of from about 1.03 MPa (1.50 psi) to about 2.76 MPa (400 psi). For poly(phenylene sulfide), the heating pressure will typically be in the range of from about contact pressure to about 0.34 MPa (50 psi), and the compression pressure will typically be in the range of from about 1.03 MPa (150 psi) to about 2.09 MPa (300 psi).

The compression device will generally consist of a compressing means, such as a press, and a set of plates, or a mold or both; however, if only contact pressure is utilized during compression, the compression device will generally only be a set of plates, or a mold, or both. Examples of suitable molds are positive pressure molds, which comprise a cavity that encloses the molded article; and frame molds, which comprise a frame which surrounds the molded articles typically on four sides. Frame molds are usually used in conjunction with plates, so that the plates are contacting the two sides of the molded article not in contact with the frame mold. Although the above molds can be utilized in the process of the present invention they are not necessary. The wrapped thermoplastic material can be adequately compressed utilizing the plates either alone (contact pressure) or in conjunction with compressing means.

Generally, the times for heating thermoplastic materials useful in the present invention will be in the range of from about 5 minutes to about 30 minutes, and the times for compression of such materials will be in the range of from about 5 minutes to about 30 minutes. Preferably, the times for heating will be in the range of from 10 minutes to 15 minutes, and the times for compression will be in the range of from 5 minutes to 15 minutes.

After compression, the wrapped thermoplastic material is cooled, preferably under pressure, more preferably under a pressure about the same as the compression pressure. The material can be cooled within the compression assembly by any suitable means, such as by flowing air or water through the mold or press. The material can also be cooled by transferring it to a cold press.

The following illustrative examples further detail the various aspects of this invention.

EXAMPLE 1

This inventive example demonstrates the use of a film wrap to allow the successful formation of a unidirectional carbon fiber-reinforced thermoplastic laminate from individual plies of unidirectional carbon fiber-reinforced thermoplastic prepreg without using a metal frame (frame mold) or mold.

Ten plies of a 40/60 wt./wt. PPS/unidirectional carbon fiber prepreg were stacked such that all plies had the same orientation, i.e. so that the carbon fibers in each ply ran substantially parallel to the carbon fibers in each of the other plies. This s tack was then wrapped with a polytetrafluoroethylene release cloth sprayed with a silicone release agent. The wrapping was done to enclose all sides of the stack. The release cloth was held in place with a small amount of masking tape. This stack was placed between two bead blasted steel caul plates and pressed in a Pasadena/Dake heated platen press at 321° C. (610° F.) for 6 minutes at 1.03 MPa (150 psi). The stack was then transferred to a cold press (approximately 100° C. (50° F.)) and held at 1.03 MPa (150 psi) for 3 minutes. Removal of the stack from the press and removal of the release cloth wrapping showed the resulting laminate to have a good appearance with very good edges and a surface duplicating the texture of the release cloth wrap used.

Example 1 illustrates that the inventive process allows the consolidation of laminates without the use of a traditional mold, yet results in a laminate having a good appearance.

EXAMPLE 2

This inventive example demonstrates the use of a smoother surface film (KAPTON ® polyimide film) to produce a smoother surface laminate.

The procedure of Example 1 was generally followed except that 2 mil KAPTON ® polyimide film was used as the wrap instead of the polytetrafluoroethylene release cloth. The resulting laminate again had a very good appearance, with the surface duplicating the surface of the smooth KAPTON ® polymide film.

A comparison of Example 1 and Example 2 illustrates that the texture of the surface of the resulting product can be altered by the choice of film used to wrap the thermoplastic material. The smoother KAPTON ® polyimide film of Example 2 resulted in a smoother laminate than did the polytetrafluoroethylene release cloth of Example 1.

EXAMPLE 3

This inventive example demonstrates the use of the film wrapping technique to successfully mold thermoplastic laminates containing no fiber reinforcements (neat laminate) from stacks of thermoplastic films containing no fiber reinforcement (neat film) using a positive pressure mold in a heated platen press.

Approximately 100 10"×10" sheets of poly(phenylene sulfide) film were stacked and wrapped on all sides with KAPTON ® polyimide film similar to the procedure of Examples 1 and 2, above. This wrapped stack was then placed into a 10"×10" positive pressure steel mold. This assembly was then placed into a heated platen press at 304° C. (580° F.) at 0.34 MPa (50 psi) for 15 minutes followed by 5 minutes at 304° C. (580° F.) at 2.09 MPa (300 psi). The press and assembly were then cooled by flowing air and water through the press platens. After cooling, the assembly was removed from the press, the mold was opened and the laminate was unwrapped. The resulting laminate contained no visible voids and had an excellent appearance.

Control 1

This non-inventive, control example shows the results of attempting to mold a neat thermoplastic laminate from neat thermoplastic film using the procedure of Example 3 without using the KAPTON ® polyimide film wrapping.

A procedure similar to that of Example 3 was used except that the stack of poly(phenylene sulfide) films was not wrapped with KAPTON ® polyimide film prior to placing the stack into the positive pressure mold. The resulting laminate contained significant visible voids and had a poor appearance.

Example 3 and Control 1 show that the inventive process results in better product than is obtainable without film wrapping. The process of Example 3 was successful in preventing voids that occur in Control 1.

Control 2

In this non-inventive example, a 16-ply quasi-isotropic fiberglass reinforced PPS laminate was made. The fiberglass reinforced PPS prepreg used was a 70/30 wt./wt. glass/ PPS composite.

The individual plies of prepreg were cut, oriented and stacked to give a 10"×10" standard quasi-isotropic layup. This was molded, without film wrap, using equipment and conditions similar to what is described in Example 3 except that compression pressure used was 0.70 MPa (100 psi). The resulting laminate had both clear and cloudy areas on the surface and stuck in the mold. It had to be removed from the mold by striking with a mallet. A standard ultrasonic scan showed the laminate to contain unacceptably high levels of voids through much of its volume.

Control 2 illustrates that not only does the inventive process reduce voids, it also reduces adhesion between the molds and the products. Example 3 did not display the adhesion that was present in Control 2.

EXAMPLE 4

In this inventive example, a 16-ply unidirectional fiberglass reinforced PPS laminate was made. The fiberglass reinforced PPS prepreg used was the same as that used in Control 2.

The individual plies of prepreg were cut, oriented and stacked to give a 6"×6" standard unidirectional layup. This was enclosed in a KAPTON ® polyimide film sprayed with silicone release agent, leaving open the ends transverse to the lengthwise direction of the fiber reinforcement. This was molded using conditions and equipment similar to those described for Examples 1 and 2, except that the compression was at 1.38 MPa (200 psi) for 3 minutes and this was preceded by a 3-minute heatup under essentially contact pressure. Also, cooling was at 1.38 MPa ( 200 psi). The resulting laminate had an excellent appearance. A standard ultrasonic scan was almost perfect, indicating an acceptably low level of voids through essentially all of its volume.

The above examples illustrate that both fiber-reinforced and neat thermoplastic material can be molded utilizing the inventive process. Moreover, the molding can be accomplished using only the film wrap or using the film wrap in conjunction with a mold or metal frame. In either case, the above examples show that a better product is formed with fewer voids. The examples also show that when a mold is used, there is less adhesion between the mold and the product in the inventive process than in a process not utilizing a film wrap.

That which is claimed is:

1. A process comprising:
   (a) wrapping a sleeve material around at least one thermoplastic material to form a sleeve-wrapped material;
   (b) placing said sleeve-wrapped material in a positive pressure mold to form a mold assembly;
   (c) heating said mold assembly so that said thermoplastic material is heated to a molten state;
   (d) compressing said mold assembly in a press so that said sleeve-wrapped material is formed into a formed material;
   (e) cooling said formed material to harden said formed material; and
   (f) removing said sleeve material from said formed material.

2. A process according to claim 1 wherein said formed material is cooled in said cooling step (e) under pressure.

3. A process according to claim 1 wherein said compressing in step (d) is at a pressure in the range of from contact pressure to about 2.76 MPa (400 psi).

4. A process according to claim 6 wherein said compressing in step (d) is at a pressure in the range of from contact pressure to 2.09 MPa (300 psi).

5. A process in accordance with claim 1 wherein said sleeve-wrapped material is heated in said heating step (c) to a temperature under a first pressure and said compressing in step (c) occurs at about said temperature and at a second pressure higher than said first pressure.

6. A process according to claim 5 wherein said first pressure is in the range of from about contact pressure to about 0.34 MPa (50 psi), said second pressure is in the range of from about 1.03 MPa (150 psi) to about 2.76 MPa (400 psi) and said temperature is sufficient to maintain the thermoplastic in an essentially molten state.

7. A process according to claim 1 wherein said sleeve material is selected from the group consisting of a polyimide film, polytetrafluoroethylene release cloth, and glass cloth fabric.

8. A process according to claim 1 further comprising coating said sleeve material with a releasing agent.

9. A process according to claim 8 wherein said releasing agent is a silicone oil or silicone wax.

10. A process according to claim 1 wherein said at least one thermoplastic material is selected from the group consisting of poly(arylene sulfides) and mixtures thereof.

11. A process according to claim 1 wherein said at least one thermoplastic material is reinforced with at least one fiber.

12. A process according to claim 11 wherein said at least one fiber is selected from the group consisting of glass, quartz, aramid, metal, ceramic and carbon fibers and mixtures of two or more thereof.

13. A process according to claim 1 further comprising placing at least one insert with said at least one thermoplastic material before said wrapping step (a) and wherein said wrapping step (a) comprises wrapping a sleeve material around said at least one insert and said at least one thermoplastic material.

14. A process according to claim 1 wherein:
   said sleeve-wrapped material is heated in said heating step (c) to a temperature under a first pressure;
   said compression step (d) is performed in said positive pressure mold and occurs at about said temperature and at a second pressure higher than said first pressure; and said formed material is cooled in said cooling step (e) under a third pressure.

15. A process according to claim 14, wherein:
said sleeve material is a polyimide film;
said at least one thermoplastic material is poly(phenylene sulfide);
said first pressure is in the range of from about contact pressure to about 0.34 MPa (50 psi);
said second pressure is in the range of from about 1.03 MPa (150 psi) to about 2.76 MPa (400 psi);
said temperature is in the range of from about 288° C. (550° F.) to about 371° C. (700° F.); and
said third pressure is about the same as said second pressure.

16. A process according to claim 1 wherein said step (a) comprises wrapping said sleeve material around at least one thermoplastic material so that at least one end of the sleeve is open.

* * * * *

UNITED STATES PATENT AND TRADEMARK OFFICE
CERTIFICATE OF CORRECTION

PATENT NO. : 5,320,700

DATED : June 14, 1994

INVENTOR(S) : Charles M. Hall et al

It is certified that error appears in the above-identified patent and that said Letters Patent is hereby corrected as shown below:

Column 6, claim 4, line 25, delete "6" and insert ---3---.

Column 6, claim 5, line 31, delete "(c)" and insert ---(d)---.

Signed and Sealed this

Sixth Day of May, 1997

Attest:

Attesting Officer

BRUCE LEHMAN

Commissioner of Patents and Trademarks